(12) United States Patent  
Takagi

(10) Patent No.: US 9,671,423 B2  
(45) Date of Patent: Jun. 6, 2017

(54) ELECTRONIC DEVICE HAVING A COVER IN WHICH A PENETRATION HOLE IS PROVIDED AND MANUFACTURING METHOD OF ELECTRONIC DEVICE

(71) Applicant: Seiko Epson Corporation, Tokyo (JP)

(72) Inventor: Shigekazu Takagi, Shiojiri (JP)

(73) Assignee: Seiko Epson Corporation (JP)

( * ) Notice: Subject to any disclaimer, the term of this patent is extended or adjusted under 35 U.S.C. 154(b) by 284 days.

(21) Appl. No.: 14/477,104

(22) Filed: Sep. 4, 2014

(65) Prior Publication Data

US 2015/0059475 A1 Mar. 5, 2015

(30) Foreign Application Priority Data

Sep. 5, 2013 (JP) ................... 2013-183797

(51) Int. Cl.
*G01P 15/125* (2006.01)
*G01P 15/08* (2006.01)

(52) U.S. Cl.
CPC ...... *G01P 15/125* (2013.01); *G01P 2015/088* (2013.01); *Y10T 29/49117* (2015.01)

(58) Field of Classification Search
CPC .. G01P 15/125; G01P 15/131; G01C 19/5705
See application file for complete search history.

(56) References Cited

U.S. PATENT DOCUMENTS

| | | | |
|---|---|---|---|
| 7,004,025 B2 | 2/2006 | Tamura | |
| 7,554,167 B2 * | 6/2009 | Vaganov | G06F 3/0338 257/415 |
| 7,816,745 B2 * | 10/2010 | Receveur | B81B 7/007 257/415 |
| 2002/0051258 A1 * | 5/2002 | Tamura | B81B 7/0041 358/514 |
| 2005/0217386 A1 * | 10/2005 | Hirose | G01L 1/2231 73/763 |
| 2012/0299127 A1 * | 11/2012 | Fujii | B60C 23/0488 257/415 |
| 2013/0074596 A1 | 3/2013 | Takizawa | |
| 2013/0208438 A1 | 8/2013 | Takagi | |
| 2013/0265701 A1 | 10/2013 | Takizawa | |

FOREIGN PATENT DOCUMENTS

| | | |
|---|---|---|
| JP | 2002-005950 A | 1/2002 |
| JP | 2005-064024 A | 3/2005 |
| JP | 2008026240 A * | 2/2008 |

(Continued)

*Primary Examiner* — Francis Gray

(74) *Attorney, Agent, or Firm* — Harness, Dickey & Pierce, P.L.C.

(57) ABSTRACT

An electronic device includes a substrate, a lid which is bonded to the substrate, and a functional element which is provided between the substrate and the lid, in which the lid includes a penetration hole which penetrates a portion between an inner surface and an outer surface, the penetration hole includes a first hole portion and a second hole portion, a flat area of the second hole portion is set to be smaller than a flat area of the first hole portion, at least a part of an inner wall surface of the second hole portion substantially forms a right angle with respect to a bottom surface of the first hole portion, and the penetration hole is sealed with a sealing member.

9 Claims, 13 Drawing Sheets

(56) References Cited

FOREIGN PATENT DOCUMENTS

| | | | |
|---|---|---|---|
| JP | 2009224387 A | * | 10/2009 |
| JP | 2013-069858 A | | 4/2013 |
| JP | 2013-079868 A | | 5/2013 |
| JP | 2013-101031 A | | 5/2013 |
| JP | 2013-102036 A | | 5/2013 |
| JP | 2013-164285 A | | 8/2013 |
| JP | 2013-232626 A | | 11/2013 |
| JP | 2014-049455 A | | 3/2014 |

* cited by examiner

ELECTRONIC DEVICE HAVING A COVER IN WHICH A PENETRATION HOLE IS PROVIDED AND MANUFACTURING METHOD OF ELECTRONIC DEVICE

CROSS-REFERENCE TO RELATED APPLICATION

This application claims priority to Japanese Patent Application No. 2013-183797 filed on Sep. 5, 2013. The entire disclosure of Japanese Patent Application No. 2013-183797 is hereby incorporated herein by reference.

BACKGROUND

1. Technical Field

The present invention relates to an electronic device, manufacturing method of electronic device, and an electronic apparatus and a moving object which include the electronic device.

2. Related Art

In the related art, as an example of the electronic device used in the electronic apparatus and the like, there is a composite sensor element which includes a planar vibrator of an angular velocity sensor and a movable body of an accelerator sensor to be in a state of being floated on a substrate with a gap interposed therebetween, in which the planar vibrator and the movable body are covered by a cover member, both elements are divided into each space portion by a partitioning wall portion, and space portions are sealed in an air tight manner in a vacuum state and an atmospheric pressure state, respectively (for example, see JP-A-2002-5950).

The composite sensor element includes a through hole (penetration hole) having a wide outer surface (outer portion) and a narrow space portion on the cover member, as a member for sealing, and has a configuration in that the through hole is sealed with a sealing member such as a resin or solder, for example.

Since the composite sensor element includes the through hole having a wide outer surface and a narrow space portion on the cover member as a member for sealing, an inner wall surface of the through hole is slanted and a tip of the through hole on the space portion side has a sharp shape. Accordingly, in the composite sensor element, the tip of the through hole on the space portion side may be damaged due to an impact from the outside.

In addition, in the composite sensor element, the through hole has a substantially pyramid shape, and when introducing a spherical sealing member for sealing by melting the member, a gap is formed between corners of the inner wall surface of the through hole and the sealing member depending on a melting state and this may result in defective sealing.

Further, in the composite sensor element, since a metal film of the through hole is provided to the tip of the space portion side, the sealing member easily wets and spreads to the tip of the space portion side, when the sealing member is melted for sealing.

Accordingly, in the composite sensor element, the melted sealing member may be scattered in the space portion, and for example, may be attached to a constituent element such as a movable body or an internal wire, and a property thereof may be degraded.

As a result, reliability of the sealing of the composite sensor element may be decreased.

In addition, in the composite sensor element, since the inner wall surface configuring the space portion of the cover member is inclined so as to have a upwardly-narrow space portion, it is necessary to have a longer distance from the planar vibrator or the movable body to the inner wall surface, on the substrate side than necessary.

Accordingly, in the composite sensor element, the cover member becomes greater than necessary, and therefore miniaturization may be disturbed.

SUMMARY

An advantage of some aspects of the invention is to solve at least a part of the problems described above, and the invention can be implemented as the following forms or application examples.

Application Example 1

This application example is directed to an electronic device including: a substrate; a cover which is bonded to the substrate; and a functional element which is provided between the substrate and the cover, in which the cover includes a penetration hole which penetrates a portion between an inner surface on the substrate side and an outer surface on a side opposite the substrate side, the penetration hole includes a first hole portion which is provided on the outer surface side, and a second hole portion which communicates with the first hole portion and is provided on the inner surface side, a flat surface of the second hole is in a circular shape, a flat area of the second hole portion is set to be smaller than a flat area of the first hole portion, at least a part of an inner wall surface of the second hole portion substantially forms a right angle with respect to a bottom surface of the first hole portion, and the penetration hole is sealed with a sealing member.

With this configuration, in the electronic device, the penetration hole includes the first hole portion which is provided on the outer surface side, and the second hole portion which is provided on the inner surface side, the flat surface of the second hole portion is in a circular shape, and at least a part of the inner wall surface of the second hole portion substantially forms a right angle with respect to the bottom surface of the first hole portion.

Accordingly, in the electronic device, the second hole portion of the penetration hole has improved strength (mechanical strength) and is hardly damaged, compared to a through hole of the related art having a sharp tip on a space portion side, for example.

In addition, in the electronic device, since the flat surface of the second hole portion of the penetration hole is in a circular shape, and the flat area of the second hole portion is smaller than the flat area of the first hole portion, the spherical sealing member the size of which is greater than that of the second hole portion and smaller than that of the first hole portion can be loaded so as to cover the second hole portion for example, and it is possible to reliably seal the second hole portion (penetration hole) by melting the sealing member.

As a result it is possible to improve the reliability of sealing of the penetration hole, in the electronic device.

Application Example 2

In the electronic device according to the application example described above, it is preferable that glass is used as a main material of the substrate and silicon is used as a main material of the cover.

With this configuration, in the electronic device, since glass is used as a main material of the substrate and silicon is used as a main material of the cover, it is possible to perform anodic bonding of the substrate and the cover. Accordingly, in the electronic device, it is possible to reliably bond the substrate and the cover to each other without using the other bonding material.

In addition, in the electronic device, since silicon is used as a main material of the cover, it is possible to easily form the shapes described in Application Example 3 or Application Example 4 described below, by using a property of silicon.

Application Example 3

In the electronic device according to the application example described above, it is preferable that the inner wall surface of the first hole portion is inclined so that the flat area on the outer surface side is greater than the flat area on the bottom surface side, and the inner wall surface and the bottom surface of the first hole portion are covered with a metal film.

With this configuration, in the electronic device, since the inner wall surface is inclined so that the flat area of the first hole portion on the outer surface side is greater than the flat area thereof on the bottom surface side, when forming the metal film on the inner wall surface by a sputtering method or a vapor-deposition method, it is possible to more reliably form the metal film, compared to a case in which the inner wall surface is vertical.

Therefore, in the electronic device, the sealing member reliably wets and spreads to the inside of the first hole portion, and thus it is possible to reliably seal the penetration hole (second hole portion).

In addition, in the electronic device, since the inner wall surface and the bottom surface of the first hole portion are covered with the metal film, that is, the inner wall surface of the second hole portion is not covered with the metal film, the sealing member hardly wets and spreads to the tip of the second hole portion on the inner surface side.

Therefore, in the electronic device, it is possible to suppress scattering of the sealing member on the substrate side through the second hole portion.

As a result, in the electronic device, it is possible to avoid attachment of the sealing member to a constituent element such as the functional element causing degradation of the property, and it is possible to further improve reliability of sealing of the penetration hole.

Application Example 4

In the electronic device according to the application example described above, it is preferable that a hole diameter of the second hole portion on the inner surface side is greater than that of the first hole portion on the bottom surface side.

With this configuration, in the electronic device, since the hole diameter of the second hole portion on the inner surface side is greater than that of the first hole portion on the bottom surface side, when discharging gas by reducing pressure or suctioning, for example, the gas can be smoothly discharged compared to a case with a constant hole diameter of the second hole portion.

Application Example 5

In the electronic device according to the application example described above, it is preferable that the cover includes a recess on the substrate side, and an inner wall surface of the recess of the cover substantially forms a right angle with respect to a bonded surface bonded to the substrate.

With this configuration, in the electronic device, since inner wall surface of the recess of the cover substantially forms a right angle with respect to a bonded surface bonded to the substrate, it is not necessary to have gaps from the constituent element such as the functional element to the inner wall surface more than necessary, compared to a case in which the inner wall surface is inclined.

Therefore, in the electronic device, it is possible to realize miniaturization of the cover, compared to the case in which the inner wall surface is inclined, and thus it is possible to perform further miniaturization.

Application Example 6

This application example is directed to a manufacturing method of an electronic device which includes a substrate, a cover which is bonded to the substrate, and a functional element which is provided between the substrate and the cover, in which the cover includes a penetration hole which penetrates a portion between an inner surface on the substrate side and an outer surface on a side opposite the substrate side, the penetration hole includes a first hole portion which is provided on the outer surface side, and a second hole portion which communicates with the first hole portion and is provided on the inner surface side, a flat surface of the second hole portion is in a circular shape, a flat area of the second hole portion is set to be smaller than a flat area of the first hole portion, at least a part of an inner wall surface of the second hole portion substantially forms a right angle with respect to a bottom surface of the first hole portion, and the penetration hole is sealed with a sealing member. The method includes: forming the first hole portion by wet etching; and forming the second hole portion by dry etching.

With this configuration, since the manufacturing method of an electronic device includes forming the first hole portion of the penetration hole of the cover by wet etching, the first hole portion can be formed in a shape in which the inner wall surface is inclined so as to set the flat area thereof on the outer surface side to be greater than the flat area thereof on the bottom surface side.

In addition, since the manufacturing method of an electronic device includes forming the second hole portion of the penetration hole of the cover by dry etching, the second hole portion can be formed in a shape in which the flat surface is in a circular shape and at least a part of the inner wall surface can substantially form a right angle with respect to the bottom surface of the first hole portion.

Therefore, it is possible to manufacture and provide the electronic device with the effects described in Application Example 1 to Application Example 3, by the manufacturing method of an electronic device.

Application Example 7

In the manufacturing method of an electronic device according to the application example described above, it is preferable that the cover includes a recess on the substrate side, and the method further includes forming the recess by dry etching.

With this configuration, since the manufacturing method of an electronic device further includes forming the recess of the cover by dry etching, the inner wall surface of the recess of the cover can substantially form a right angle with respect to the bonded surface bonded to the substrate.

Therefore, it is possible to manufacture and provide the electronic device with the effects described in Application Example 5, by the manufacturing method of an electronic device.

Application Example 8

This application example is directed to an electronic apparatus including the electronic device according to any one of Application Examples described above.

With this configuration, since the electronic apparatus having the configuration includes the electronic device according to any one of Application Examples described above, the effects described in the Application Examples described above are reflected and an electronic apparatus having excellent reliability can be provided.

Application Example 9

This application example is directed to a moving object including the electronic device according to any one of Application Examples described above.

With this configuration, since the moving object having the configuration includes the electronic device according to any one of Application Examples described above, the effects described in the Application Examples described above are reflected and a moving object having excellent reliability can be provided.

BRIEF DESCRIPTION OF THE DRAWINGS

The invention will be described with reference to the accompanying drawings, wherein like numbers reference like elements.

FIGS. 5A to 5C are enlarged schematic views of a B part of FIG. 2, in which FIG. 5A is a schematic plan view, FIG. 5B is a schematic cross-sectional view taken along line E-E in FIG. 5A, and FIG. 5C is a schematic cross-sectional view taken along line F-F in FIG. 5A.

FIGS. 6A and 6B are enlarged schematic views of a C part of FIG. 2, in which FIG. 6A is a schematic plan view, and FIG. 6B is a schematic cross-sectional view taken along line G-C, in FIG. 6A.

DESCRIPTION OF EXEMPLARY EMBODIMENTS

Hereinafter, embodiments of the invention will be described in detail with reference to the drawings.
Acceleration Sensor First, an acceleration sensor will be described as an example of the electronic device.

Figure 1:
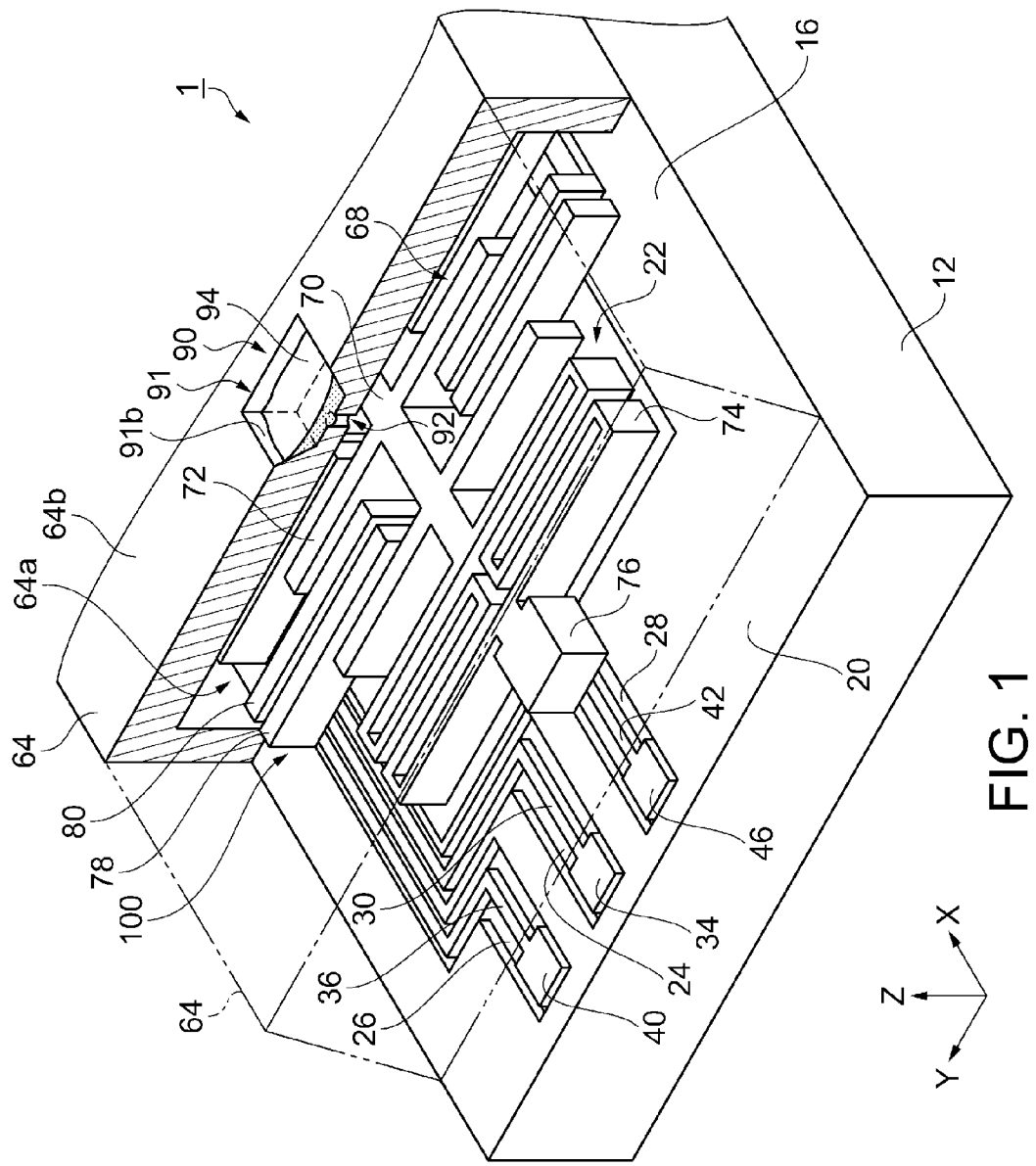
FIG. 1 is a schematic perspective view showing a schematic configuration of an acceleration sensor.
Figure 2:
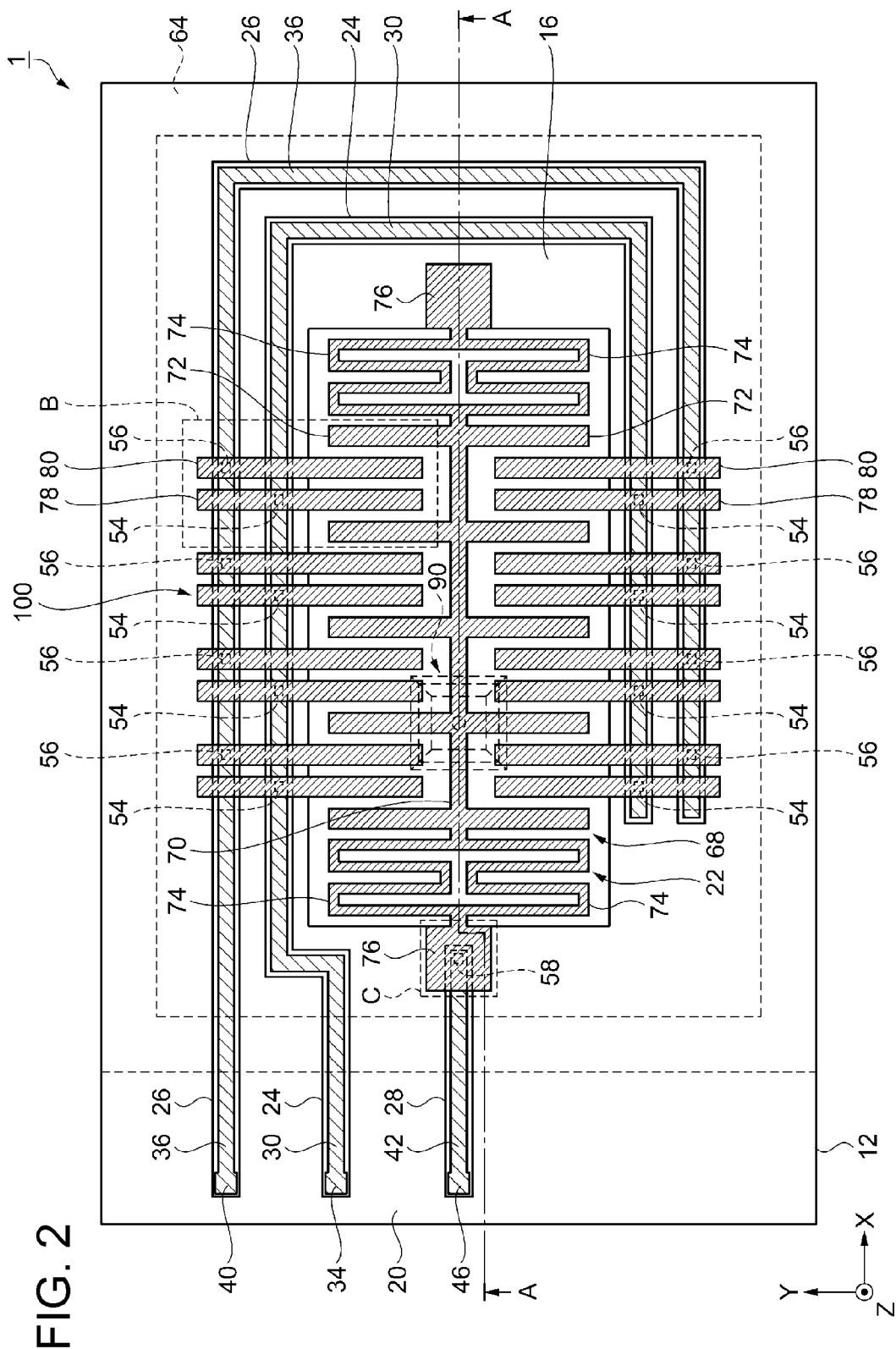
FIG. 2 is a schematic plan view showing a schematic configuration of an acceleration sensor of FIG. 1.
Figure 3:
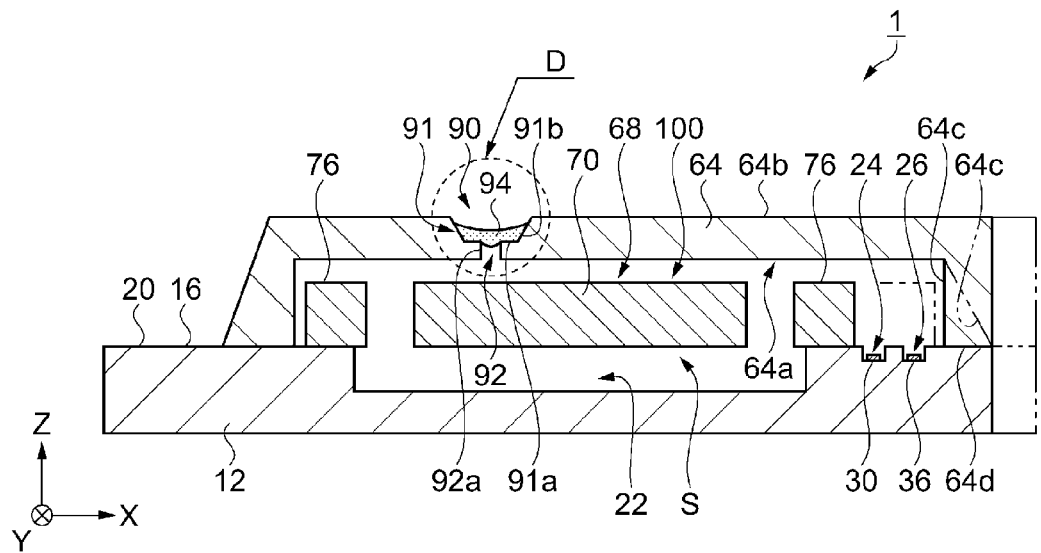
FIG. 3 is a schematic cross-sectional view taken along line A-A in FIG. 2.
Figure 4:
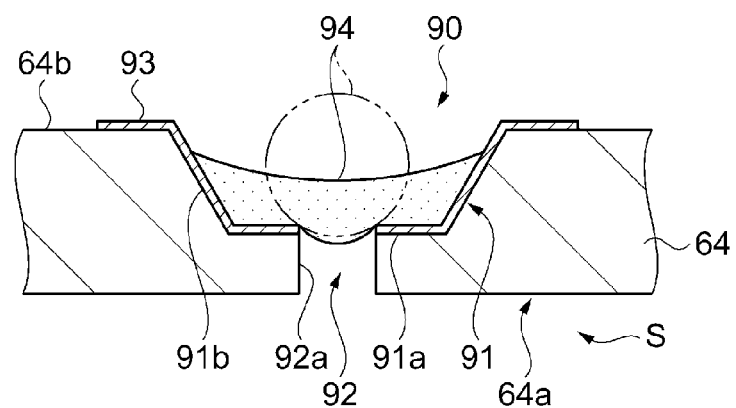
FIG. 4 is an enlarged schematic view of a D part of FIG. 3.

FIG. 1 is a schematic perspective view showing a schematic configuration of an acceleration sensor. FIG. 2 is a schematic plan view showing a schematic configuration of the acceleration sensor of FIG. 1. FIG. 3 is a schematic cross-sectional view taken along line A-A in FIG. 2. FIG. 4 is an enlarged schematic view of a D part of FIG. 3.

Figure 5A:
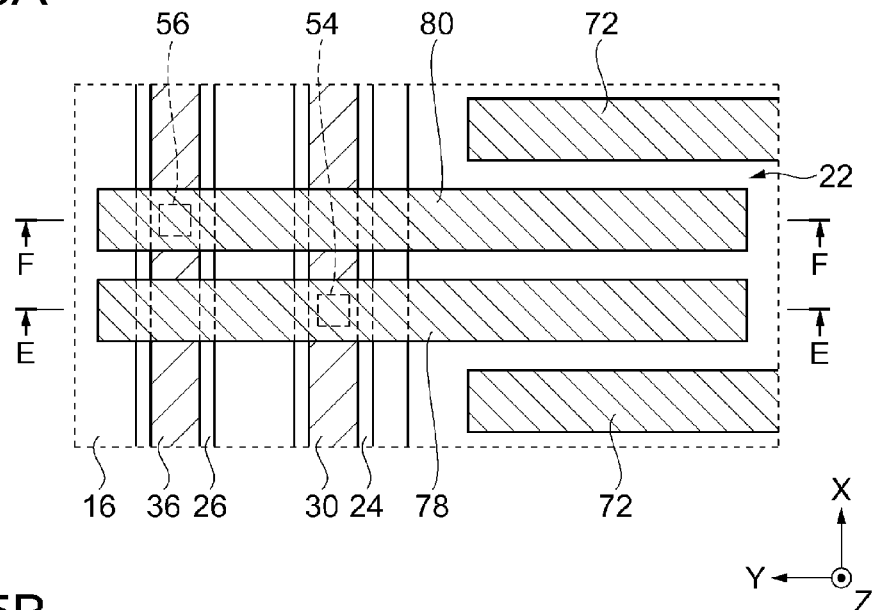
Figure 5B:
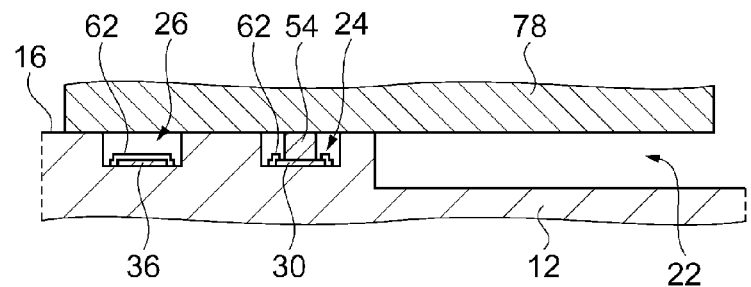
Figure 5C:
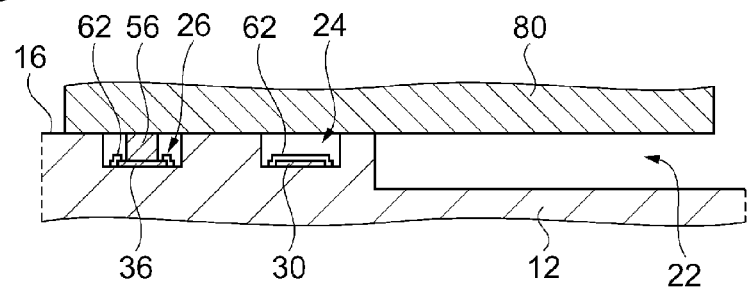

FIGS. 5A to 5C are enlarged schematic views of a B part of FIG. 2, in which FIG. 5A is a schematic plan view, FIG. 5B is a schematic cross-sectional view taken along line E-E in FIG. 5A, and FIG. 5C is a schematic cross-sectional view taken along line F-F in FIG. 5A.

Figure 6A:
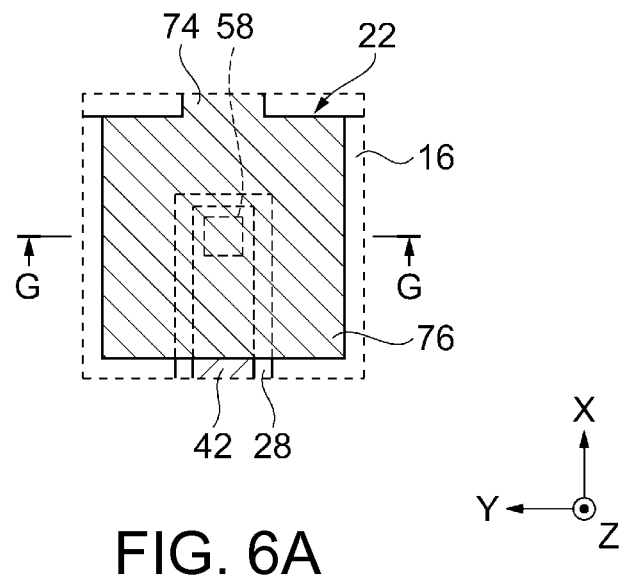
Figure 6B:
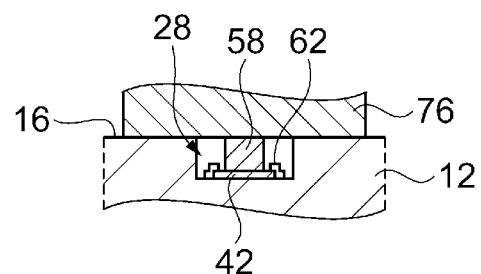

FIGS. 6A and 6B are enlarged schematic views of a C part of FIG. 2, in which FIG. 6A is a schematic plan view, and FIG. 6B is a schematic cross-sectional view taken along line G-G in FIG. 6A. In each drawing, a part of constituent elements is omitted for convenience. In addition, in each drawing, a ratio of a dimension of each constituent element is different from an actual ratio, for simple description. An X axis, a Y axis, and a Z axis in the drawings are coordinate axes orthogonal to each other, and a direction of an arrow is a positive direction.

As shown in FIGS. 1 to 3, an acceleration sensor 1 includes a substrate 12 having a substantially rectangular flat plate shape, a lid 64 as a cover which includes a recess 64a provided on a side facing the substrate 12 and is bonded to the substrate 12, and a functional element 100 provided between the substrate 12 and the lid 64.

The functional element 100 is formed of a semiconductor substrate (not shown) disposed on the substrate 12 by photolithography and etching.

The functional element 100 is configured to include a movable portion 68, first fixed electrode fingers 78, and second fixed electrode fingers 80, and functions as a sensor element for detecting acceleration.

The substrate 12 is a flat surface orthogonal to the Z axis, and includes a main surface 16 which is bonded to the plurality of first fixed electrode fingers 78 and second fixed electrode fingers 80. A terminal portion 20 is provided on an end portion of the main surface 16 in a negative X direction, and an area of the main surface 16 where the terminal portion 20 is not formed, is covered with the lid 64 including the recess 64a on the main surface 16.

A recess 22 having a substantially rectangular flat surface shape is provided at the substantially center portion of the main surface 16 in order to avoid interference with the movable portion 68 and the substrate 12. Accordingly, a movable area (displaceable area) of the movable portion 68 is accommodated in the recess 22 in a plan view.

On the main surface 16, a first groove portion 24 is provided along an outer periphery of the recess 22 and a second groove portion 26 is provided along an outer periphery of the first groove portion 24. In addition, on the main surface 16 on the terminal portion 20 side, a third groove portion 28 is provided on a side opposite the second groove portion 26 with the first groove portion 24 interposed therebetween.

As shown in FIG. 2, the first groove portion 24 and the second groove portion 26 are extended so as to surround the recess 22 from a negative Y side of the recess 22 counterclockwise and are provided to the terminal portion 20 on the negative X side of the recess 22. The third groove portion 28 is provided from the negative X side of the recess 22 and to the terminal portion 20 along the first groove portion 24 and the second groove portion 26.

An insulating material such as glass or high resistance silicon is preferably used as a configuration material of the substrate 12. Particularly, in a case where a semiconductor substrate formed of the movable portion 68, the first fixed electrode fingers 78, and the second fixed electrode fingers 80 is configured using a semiconductor material such as silicon as a main material, glass (for example, borosilicate glass such as Pyrex (trade name)) including alkali metal ions (movable ions) is preferably used as the configuration material of the substrate 12.

Accordingly, it is possible to perform anodic bonding of the substrate 12 and the semiconductor substrate, in the acceleration sensor 1. In addition, by using the glass including alkali metal ions for the substrate 12, it is possible to easily insulate and separate the substrate 12 and the semiconductor substrate from each other, in the acceleration sensor 1.

The substrate 12 may not necessarily have an insulation property, and may be a semiconductor substrate formed of a low resistance silicon, for example. In this case, an insulation film is interposed between the substrate 12 and the semiconductor substrate for insulation and separation.

In addition, as the configuration material of the substrate 12, it is preferable that a difference in a thermal expansion coefficient between the configuration material of the substrate 12 and the configuration material of the semiconductor substrate is small as possible, and in detail, it is preferable that a difference in a thermal expansion coefficient between the configuration material of the substrate 12 and the configuration material of the semiconductor substrate is equal to or less than 3 ppm/° C. Therefore, it is possible to decrease residual stress between the substrate 12 and the semiconductor substrate, in the acceleration sensor 1.

Herein, it is assumed that glass is used as the main material of the substrate 12.

A first wire 30 is provided on a bottom surface of the first groove portion 24 along the first groove portion 24, a second wire 36 is provided on a bottom surface of the second groove portion 26 along the second groove portion 26, and a third wire 42 is provided on a bottom surface of the third groove portion 28 along the third groove portion 28.

The first wire 30 is a wire electrically connected to the first fixed electrode fingers 78, the second wire 36 is a wire electrically connected to the second fixed electrode fingers 80, and the third wire 42 is a wire electrically connected to a fixed portion 76 which will be described later.

End portions of the first wire 30, the second wire 36, and the third wire 42 (end portions disposed on the terminal portion 20) are a first terminal electrode 34, a second terminal electrode 40, and a third terminal electrode 46, respectively.

A configuration material of the first wire 30, the second wire 36, and the third wire 42 is not particularly limited as long as it has conductivity, and various electrode materials can be used. An example thereof includes oxide (transparent electrode material) such as indium tin oxide (ITO), indium zinc oxide (IZO), $In_2O_3$, $SnO_2$, Sb-containing $SnO_2$, or Al-containing ZnO, Au, Pt, Ag, Cu, or Al or alloy including those, and one kind or a combination of two or more kinds from these can be used.

In the acceleration sensor 1, if the configuration material of each wire is the transparent electrode material (particularly ITO), when the substrate 12 is transparent, it is possible to easily visually observe foreign materials existing on surfaces of the first fixed electrode fingers 78 and the second fixed electrode fingers 80 from the surface on a side opposite the main surface 16 side of the substrate 12, and therefore it is possible to efficiently perform inspection.

The movable portion 68 is configured with an arm 70, movable electrode fingers 72, flexible portions 74, and fixed portions 76. Among them, the arm 70, the movable electrode fingers 72, and the flexible portions 74 are disposed in a position of the substrate 12 facing the recess 22, that is, a position accommodated in the recess 22 when seen from the Z axis direction.

As shown in FIG. 2, the arm 70 is extended to have a beam shape (columnar shape) along the X axis direction, and the flexible portions 74 are disposed on both end portions thereof in the X axis direction which is a displaceable direction. The plurality of movable electrode fingers 72 are extended to have a comb shape in a direction (Y axis direction) orthogonal to the extension direction of the arm 70 at constant intervals along the extension direction of the arm 70.

The movable portions 74 are provided to be a pair on the positive Y side and the negative Y side of the arm 70, and are extended in the X axis direction to be connected to the fixed portion 76 while being folded back in the Y axis direction, respectively. The flexible portions 74 are formed so as to be bent (deformed) in the X axis direction due to an external force applied from the X axis direction. The flexible portions 74 have a structure of being hardly deformed with respect to an external force applied from directions other than the X axis direction, for example, the Y axis direction and the Z axis direction.

Each of the fixed portions 76 is connected to an end portion of the flexible portion 74 and is bonded to the substrate 12. In addition, one of the fixed portions 76 (one positioned on the negative X side of the recess 22) is disposed in a position over the third groove portion 28 of the substrate 12.

The arm 70 configured as described above has a structure of being easily displaced with respect to the acceleration applied from the X axis direction and hardly displaced with respect to the acceleration applied from the Y axis direction and the Z axis direction.

The first fixed electrode fingers 78 are disposed in positions over the first groove portion 24 and the second groove portion 26 of the substrate 12. In addition, each of the first fixed electrode fingers 78 is disposed so that apart thereof is overlapped with the recess 22 when seen from the Z axis direction (in plan view).

The second fixed electrode fingers 80 are disposed in parallel with the first fixed electrode fingers 78, and are disposed in positions over the first groove portion 24 and the second groove portion 26 of the substrate 12. In addition, in the same manner as the first fixed electrode fingers 78, each of the second fixed electrode fingers 80 is disposed so that a part thereof is overlapped with the recess 22 when seen from the Z axis direction. The first fixed electrode fingers 78 and the second fixed electrode fingers 80 are disposed to be interposed between the movable electrode fingers 72 disposed in a comb shape.

As shown in FIGS. 5A to 5C, protrusions 54 having conductivity are formed in positions of the first wire 30 overlapped with the first fixed electrode fingers 78 in a plan view.

In the acceleration sensor 1, the first wire 30 and the first fixed electrode fingers 78 are electrically connected to each other through the protrusions 54. Accordingly, the first terminal electrode 34 is electrically connected to the first fixed electrode fingers 78 through the first wire 30.

In the same manner described above, protrusions 56 having conductivity are formed in positions of the second wire 36 overlapped with the second fixed electrode fingers 80 in a plan view.

In the acceleration sensor 1, the second wire 36 and the second fixed electrode fingers 80 are electrically connected to each other through the protrusions 56. Accordingly, the second terminal electrode 40 is electrically connected to the second fixed electrode fingers 80 through the second wire 36.

As shown in FIGS. 6A and 6B, a protrusion 58 having conductivity is formed in a position of the third wire 42 overlapped with the fixed portion 76 of the recess 22 in the negative X side in a plan view.

In the acceleration sensor 1, the third wire 42 and the fixed portion 76 are electrically connected to each other through the protrusion 58. Accordingly, the third terminal electrode 46 is electrically connected to the fixed portion 76 through the third wire 42, and is electrically connected to the movable electrode fingers 72 through the fixed portion 76, the flexible portion 74, and the arm 70.

The configuration material of the protrusions 54, 56, and 58 are not particularly limited as long as it has conductivity, and various electrode materials can be used. For example, metal such as a metal single substance such as Au, Pt, Ag, Cu, or Al or alloy including these is preferably used.

The protrusions 54, 56, and 58 may be configured so that the protrusion protruded from the bottom surface of each groove portion of the substrate 12 is covered with each wire.

In addition, it is preferable that the areas of the first wire 30, the second wire 36, and the third wire 42 except for the first terminal electrode 34, the second terminal electrode 40, the third terminal electrode 46, and the protrusions 54, 56, and 58 are covered with insulation films 62 containing $SiO_2$, for example, in order to avoid short circuit with the other constituent elements.

As shown in FIGS. 1 to 4, the lid 64 includes a penetration hole 90 which penetrates through a portion between the recess 64a and an outer surface 64b.

The penetration hole 90 is configured to include a first hole portion 91 provided on the outer surface 64b side, and a second hole portion 92 which communicates with the first hole portion 91 and is provided on the recess 64a side.

The first hole portion 91 includes four inner wall surfaces 91b which are inclined so as to have a greater flat area on the outer surface 64b than a flat area on a bottom surface 91a side, and is formed in a substantially square pyramid shape.

As shown in FIG. 4, the inner wall surfaces 91b and the bottom surface 91a of the first hole portion 91 are coated with a metal film 93. The metal film 93 may be extended to the outer surface 64b. The metal film 93 is omitted in the drawings except for some drawings.

The flat surface of the second hole portion 92 is formed in a circular shape. In addition, the second hole portion 92 is formed so as to have a smaller flat area than the flat area of the first hole portion 91 (flat area of the bottom surface 91a).

The second hole portion 92 is formed so that at least a part (herein, entirety) of an inner wall surface 92a substantially forms a right angle (inclination of approximately ±7 degrees is within an acceptable range) with respect to the bottom surface 91a of the first hole portion 91. That is, the inner wall surface 92a of the second hole portion 92 is formed in a cylinder shape. In addition, it is preferable that the second hole portion 92 is provided substantially at the center portion of the bottom surface 91a of the first hole portion 91, from a viewpoint of reliability of sealing which will be described later.

The penetration hole 90 is sealed with a sealing member 94.

In detail, after the lid 64 is bonded (fixed) to the main surface 16 of the substrate 12 in an airtight manner by using bonding using an adhesive, anodic bonding, or direct bonding, the spherical sealing member 94 the size of which is greater than that of the second hole portion 92 and smaller than that of the first hole portion 91 is loaded on the metal film 93 of the bottom surface 91a of the first hole portion 91 of the penetration hole 90, so as to cover the second hole portion 92. Then, the sealing member 94 is irradiated with a laser beam or an electronic beam, and the melted sealing member 94 wets and spreads to inside the first hole portion 91, and therefore the second hole portion 92 is sealed (closed).

The lid 64 is bonded to the substrate 12, and a space configured to include the recess 22 of the substrate 12 and the recess 64a of the lid 64 is set as an internal space S.

The internal space S of the acceleration sensor 1 sealed by the sealing of the penetration hole 90 in an airtight manner is in a state where inert gas such as nitrogen, helium, or argon is filled to be closer to an atmospheric pressure, or a reduced pressure state (state having high degree of vacuum).

As shown in FIG. 3, an inner wall surface 64c of the recess 64a of the lid 64 substantially forms a right angle (inclination of approximately ±7 degrees is within an acceptable range) with respect to a bonded surface 64d bonded to the substrate 12.

The configuration material of the lid 64 is not particularly limited, and silicon, glass, or the like can be preferably used, for example. Herein, it is assumed that silicon is used as the main material of the lid 64. It is preferable that a crystal surface of a (1, 1, 0) surface of silicon of the lid 64 is formed along the outer surface 64b, since the shape of the embodiment is reliably formed.

The configuration material of the sealing member 94 is not particularly limited, and an Au—Ge alloy, an Au—Sn alloy, an Sn—Pb alloy, a Pb—Ag alloy, or the like can be preferably used.

The configuration of the metal film 93 is not particularly limited, and a configuration in which Au is laminated on a base layer of a Ti—W alloy, a configuration in that Au is laminated on a base layer of Cr, or the like can be preferably used.

Herein, an operation of the acceleration sensor 1 will be described.

In the acceleration sensor 1, a first capacitor is formed between the first fixed electrode finger 78 and the movable electrode finger 72 facing first fixed electrode finger 78 from the negative X axis side, and a second capacitor is formed between the second fixed electrode finger 80 and the movable electrode finger 72 facing the second fixed electrode finger 80 from the positive X side.

In this state, when the acceleration is applied to the acceleration sensor 1 in the negative X direction, for example, the arm 70 and the movable electrode fingers 72 are displaced in the positive X direction due to inertia. At that time, since a gap between the first fixed electrode finger 78 and the movable electrode finger 72 becomes narrow, capacitance of the first capacitor increases. In addition, since a gap between the second fixed electrode finger 80 and the movable electrode finger 72 becomes wide, capacitance of the second capacitor decreases.

Reversely, when the acceleration is applied in the positive X direction and the arm 70 and the movable electrode fingers 72 are displaced in the negative X direction, the capacitance of the first capacitor decreases and the capacitance of the second capacitor increases.

Therefore, in the acceleration sensor 1, it is possible to detect the magnitude and the direction of the acceleration applied to the acceleration sensor 1 by detecting a difference between the change in the capacitance of the first capacitor detected between the first terminal electrode 34 and the third terminal electrode 46 and the change in the capacitance of the second capacitor detected between the second terminal electrode 40 and the third terminal electrode 46. In addition, since the acceleration sensor 1 detects the difference between the changes in the capacitance of two capacitors, it is possible to detect the acceleration with high sensitivity.

As described above, in the acceleration sensor 1, the penetration hole 90 includes the first hole portion 91 provided on the outer surface 64*b* side and the second hole portion 92 provided on the recess 64*a* side, the flat surface of second hole portion 92 is formed in a circular shape, and at least a part (herein, entirety) of the inner wall surface 92*a* substantially forms aright angle with respect to the bottom surface 91*a* of the first hole portion 91.

Therefore, in the acceleration sensor 1, when compared to a through hole (corresponding to penetration hole 90) having a sharp tip on a space portion (corresponding to internal space S) of the related art, for example, strength (mechanical strength) of the second hole portion 92 of the penetration hole 90 is improved, and both of a connected portion of the first hole portion 91 with the bottom surface 91*a* and a connected portion of the first hole portion with the recess 64*a* are hardly damaged.

In addition, in the acceleration sensor 1, since the flat surface of the second hole portion 92 of the penetration hole 90 is formed in a circular shape and the size of the flat area thereof is smaller than that of the flat area of the first hole portion 91, the spherical sealing member 94 the size of which is greater than that of the second hole portion 92 and smaller than that of the first hole portion 91 can be loaded so as to cover the second hole portion 92, for example, and it is possible to reliably seal the second hole portion 92 by melting the sealing member.

At that time, in the acceleration sensor 1, since the flat surface of the second hole portion 92 is formed in a circular shape, the spherical sealing member 94 can be stably loaded on the second hole portion 92.

As a result, it is possible to improve the reliability of sealing of the penetration hole 90, in the acceleration sensor 1.

In the acceleration sensor 1, since glass is used as the main material of the substrate 12 and silicon is used as the main material of the lid 64, it is possible to perform anodic bonding of the substrate 12 and the lid 64. Accordingly, in the acceleration sensor 1, it is possible to reliably bond the substrate 12 and the lid 64 to each other without using the other bonding material.

In addition, in the acceleration sensor 1, since silicon is used as the main material of the lid 64, it is possible to easily form the inclined shape of the inner wall surface 91*b* so as to set the flat area of the first hole portion 91 of the penetration hole 90 on the outer surface 64*b* side greater than the flat area thereof on the bottom surface 91*a* side, or the shape in which a hole diameter of the second hole portion 92 of the penetration hole 90 on the recess 64*a* side is greater than that of the first hole portion 91 on the bottom surface 91*a* side, described in Modification Example below, by using the property of the silicon.

Further, in the acceleration sensor 1, since the inner wall surface 91*b* is inclined so that the flat area of the first hole portion 91 of the penetration hole 90 on the outer surface 64*b* side is set to be greater than the flat area thereof on the bottom surface 91*a* side, when forming the metal film 93 on the bottom surface 91*a* and the inner wall surface 91*b* by a sputtering method, a vapor-deposition method or the like, it is possible to more reliably form the metal film 93 on the inner wall surface 91*b*, compared to a case in which the inner wall surface 91*b* is vertical (forming right angle with respect to the bottom surface 91*a*).

Therefore, in the acceleration sensor 1, the sealing member 94 reliably wets and spreads to the inside of the first hole portion 91, and thus it is possible to reliably seal the penetration hole 90 (second hole portion 92).

In addition, in the acceleration sensor 1, since the bottom surface 91*a* and the inner wall surface 91*b* of the first hole portion 91 of the penetration hole 90 are covered with the metal film 93, that is, the inner wall surface 92*a* of the second hole portion 92 is not covered with the metal film 93, the sealing member 94 hardly wets and spreads to the tip of the second hole portion 92 on the recess 64*a* side.

Therefore, in the acceleration sensor 1, it is possible to suppress scattering of the melted sealing member 94 in the recess 64*a* (internal space S).

As a result, in the acceleration sensor 1, it is possible to avoid attachment of the sealing member 94 to the constituent element such as the functional element 100 causing degradation of the property, and it is possible to further improve reliability of sealing of the penetration hole 90.

In the acceleration sensor 1, since the inner wall surface 64*c* of the recess 64*a* of the lid 64 substantially forms a right angle with respect to the bonded surface 64*d* bonded to the substrate 12, it is not necessary to have gaps from the constituent element such as the functional element 100 to the inner wall surface 64*c* more than necessary, compared to a case in which the inner wall surface 64*c* is inclined as shown with a dashed-two dotted line shown on the right side of FIG. 3.

Therefore, in the acceleration sensor 1, as shown in FIG. 3, it is possible to realize miniaturization of the lid 64, compared to the case in which the inner wall surface 64*c* is inclined, and thus it is possible to perform further miniaturization.

Herein, a manufacturing method of the acceleration sensor 1 will be described.

Figure 7:
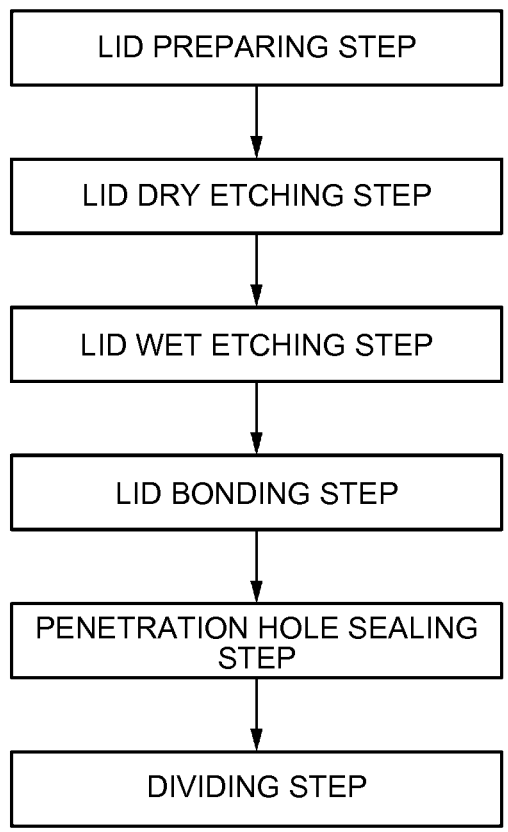
FIG. 7 is a flowchart showing a main manufacturing step of an acceleration sensor.

FIG. 7 is a flowchart showing a main manufacturing step of the acceleration sensor. FIGS. 8A to 8E, FIGS. 9A to 9E, and FIGS. 10A to 10D are schematic cross-sectional views illustrating main manufacturing steps of the acceleration sensor. The sectioned position of each drawing is the same as that of FIG. 3.

As shown in FIG. 7, the manufacturing method of the acceleration sensor includes a lid preparing step, a lid dry etching step, a lid wet etching step, a lid bonding step, a penetration hole sealing step, and a dividing step.

Lid Preparing Step

Figure 8A:
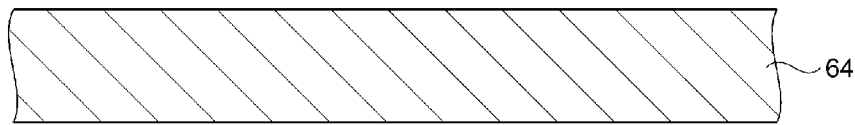
FIGS. 8A to 8E are schematic cross-sectional views illustrating main manufacturing steps of an acceleration sensor.

First, as shown in FIG. 8A, an unprocessed lid 64 (silicon substrate) formed in a flat wafer shape with a plurality of substrates is prepared. It is preferable that the silicon substrate has crystal orientation of (1, 1, 0) surface.

Lid Dry Etching Step

Figure 8B:
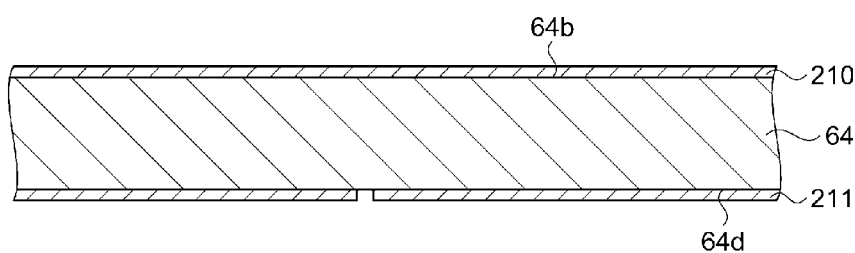

Next, as shown in FIG. 8B, etching protection films 210 and 211 are formed on the entire surfaces of the outer surface 64b side and the bonded surface 64d side of the lid 64. The etching protection films 210 and 211 may be oxide films such as $SiO_2$ formed by performing thermal oxidation of a surface of silicon.

The etching protection films 210 and 211 are patterned in the shape of the second hole portion 92 of the penetration hole 90.

Figure 8C:
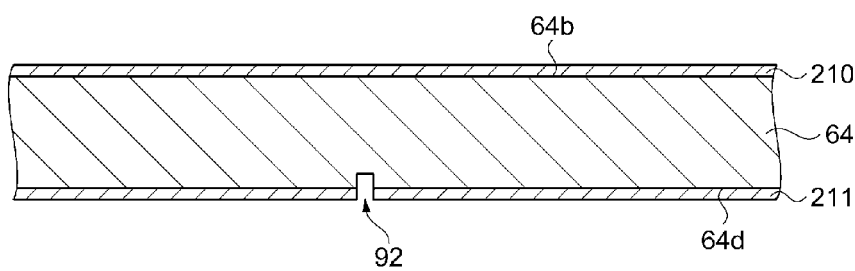

As shown in FIG. 8C, the shape of the second hole portion 92 of the penetration hole 90 of the lid 64 is formed by dry etching using etching gas such as sulfur hexafluoride (SF6) gas.

Figure 8D:
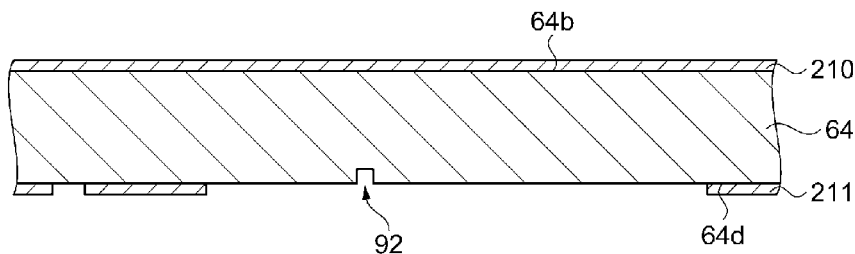

As shown in FIG. 8D, the etching protection films 210 and 211 are patterned in the shape of the second hole portion 92 of the penetration hole 90 and the shape of the recess 64a.

Figure 8E:
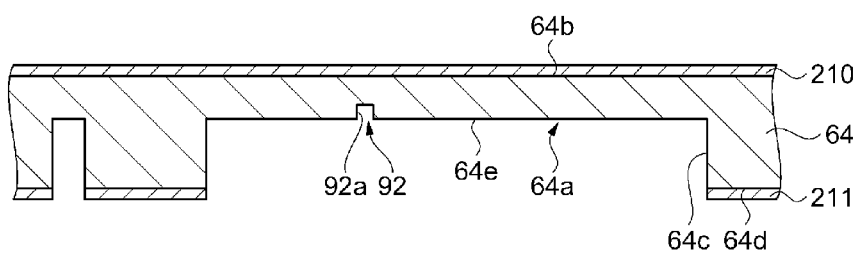

As shown in FIG. 8E, the shape of the second hole portion 92 of the penetration hole 90 and the shape of the recess 64a of the lid 64 are formed by dry etching using etching gas such as sulfur hexafluoride (SF6) gas.

At that time, the inner wall surface 92a of the second hole portion 92 and the inner wall surface 64c of the recess 64a are subjected to dry etching, and therefore are not affected by directions of the crystal surface of silicon and substantially form a right angle with respect to the bonded surface 64d and a ceiling surface 64e of the recess 64a. In addition, in the same manner as described above, the second hole portion 92 is subjected to dry etching, and therefore the flat surface shape thereof is not affected by directions of the crystal surface of silicon and is a circular shape.

Herein, when the second hole portion 92 and the recess 64a are subjected to wet etching, as in the lid wet etching which will be described later, the second hole portion and the recess are affected by directions of the crystal surface of silicon, and accordingly the inner wall surface 92a of the second hole portion 92 is inclined so that the recess 64a side is widened, and the inner wall surface 64c of the recess 64a is inclined so that the bonded surface 64d side is widened. In addition, the flat surface shape of the second hole portion 92 becomes a square.

The recess on the left side of the drawing becomes a protection portion which temporarily covers the terminal portion 20 of the substrate 12.

Lid Wet Etching Step

Figure 9F:
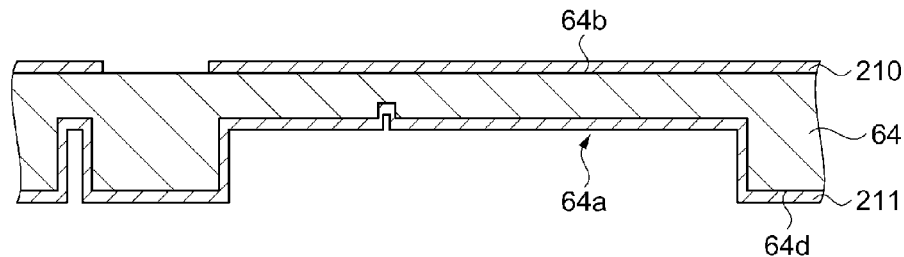
FIGS. 9F to 9J are schematic cross-sectional views illustrating main manufacturing steps of an acceleration sensor.

Next, after peeling off the etching protection films 210 and 211 once, as shown in FIG. 9F, the etching protection films 210 and 211 are formed again over the entire surfaces of the outer surface 64b side and the recess 64a side (bonded surface 64d side), and the etching protection film 210 on the outer surface 64b side is patterned in the shape of the terminal portion 20 side of the lid 64.

Figure 9G:
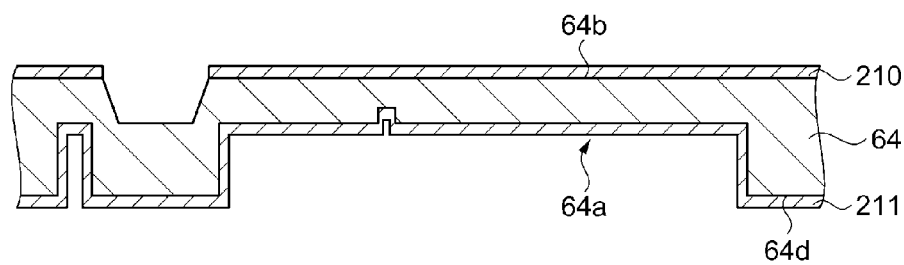

As shown in FIG. 9G, a half of the shape of the terminal portion 20 side of the lid 64 is formed, by wet etching using an etching solution such as a potassium hydroxide (KOH) aqueous solution.

Figure 9H:
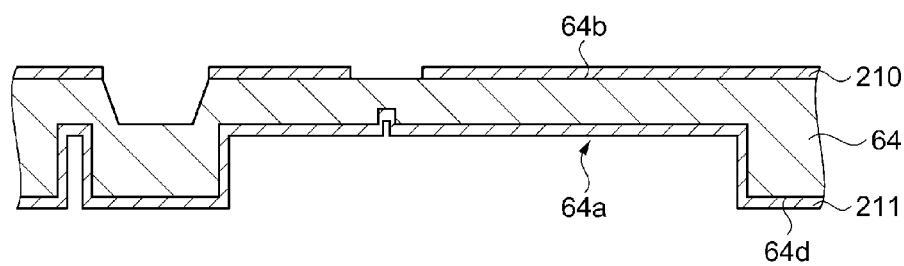

As shown in FIG. 9H, the etching protection film 210 is patterned in the shape of the first hole portion 91 of the penetration hole 90 of the lid 64.

Figure 9I:
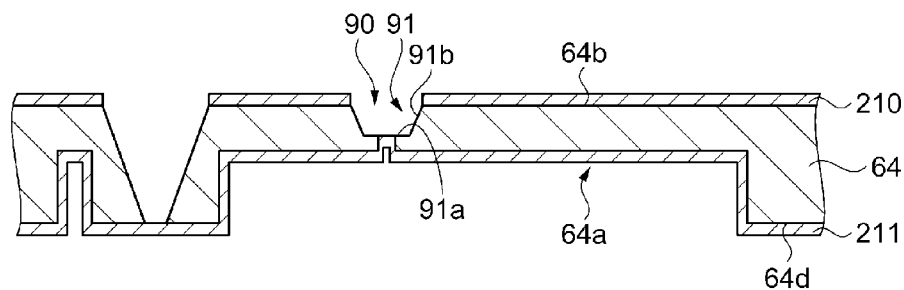

As shown in FIG. 9I, the shape of the first hole portion 91 of the penetration hole 90 is formed to be continued from the shape of the terminal portion 20 side of the lid 64, by wet etching using an etching solution such as a potassium hydroxide (KOH) aqueous solution.

At that time, the crystal surface of (1, 1, 0) surface of silicon is along the outer surface 64b and the lid 64 is subjected to the wet etching, and accordingly, the inner wall surface 91b is formed to be inclined so that the flat area of the first hole portion 91 of the penetration hole 90 on the outer surface 64b side is greater than the flat area of that on the bottom surface 91a side (that is, the outer surface 64b side of the first hole portion 91 is widened).

Figure 9J:
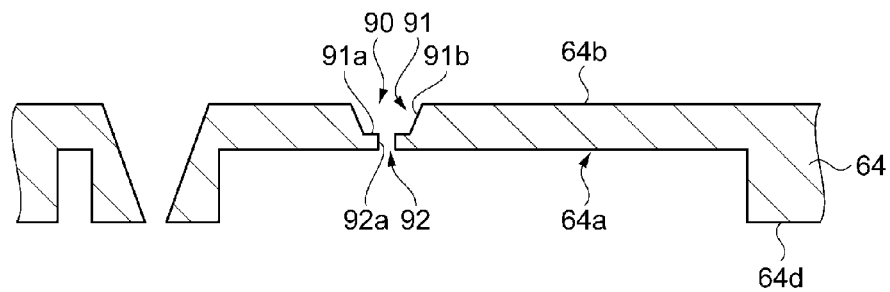

As shown in FIG. 9J, the etching protection films 210 and 211 are peeled off. Accordingly, the first hole portion 91 and the second hole portion 92 of the penetration hole 90 communicate with each other. The inner wall surface 92a of the second hole portion 92 substantially forms a right angle with respect to the bottom surface 91a of the first hole portion 91.

Herein, when the second hole portion 92 is formed by wet etching from the recess 64a side, as described above, the inner wall surface 92a of the second hole portion 92 is inclined so that the recess 64a side is widened, and the connected portion of the first hole portion 91 with the bottom surface 91a becomes sharp, and therefore the penetration hole 90 may be easily damaged.

Lid Bonding Step

Figure 10K:
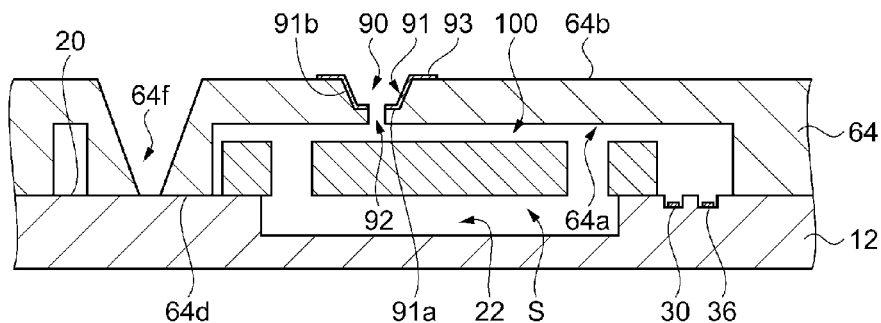
FIGS. 10K to 10N are schematic cross-sectional views illustrating main manufacturing steps of an acceleration sensor.

Next, as shown in FIG. 10K, the recess 22, the first wire 30, the second wire 36, the third wire 42 (not shown), and the like are provided, and the lid 64 in which the bottom surface 91a and the inner wall surface 91b of the first hole portion 91 of the penetration hole 90 and a part of the outer surface 64b are coated with the metal film 93 in advance, is bonded (fixed) to the substrate 12 in a wafer shape with a plurality of plates on which the functional element 100 is disposed, so as to cover the functional element 100 with the recess 64a.

The metal film 93 may be formed after the lid 64 is bonded to the substrate 12. In this case, a method of selectively sputtering the metal film 93 by using an opening mask can be used, for example.

As a bonding method of the lid 64, bonding using an adhesive, anodic bonding, direct bonding, or the like can be preferably used, for example. Herein, anodic bonding is assumed.

In a V-shaped groove 64f on the left side of the FIG. 10K, a filling member such as $SiO_2$ or SiN, for example, is formed as a film on a gap portion (see FIG. 1 and FIG. 2) where the bonded surface 64d of the lid 64 on the terminal portion 20 side and each groove portion on which each wire (not shown) extended to the terminal portion 20 of the substrate 12 is provided intersect with each other, by using a sputtering method, a CVD method, or the like and seals the gap portion thereof in an airtight manner.

When forming this film, the lid 64 is extended so as to cover the terminal portion 20 in order to prevent attachment of the filling member to the terminal portion 20.

Penetration Hole Sealing Step

Figure 10L:
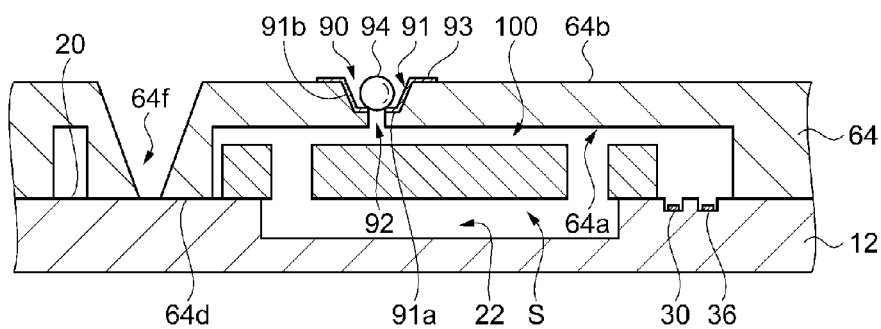

Next, as shown in FIG. 10L, when the internal space S is in a state where inert gas such as nitrogen, helium, or argon is filled to be closer to an atmospheric pressure, or a reduced pressure state (state having high degree of vacuum), the spherical sealing member 94 is loaded on the first hole portion 91 of the penetration hole 90 of the lid 64 so as to cover the second hole portion 92.

At that time, since the flat surface of the second hole portion 92 is formed in a circular shape, the spherical sealing member 94 can be stably loaded on the second hole portion 92.

Figure 10M:
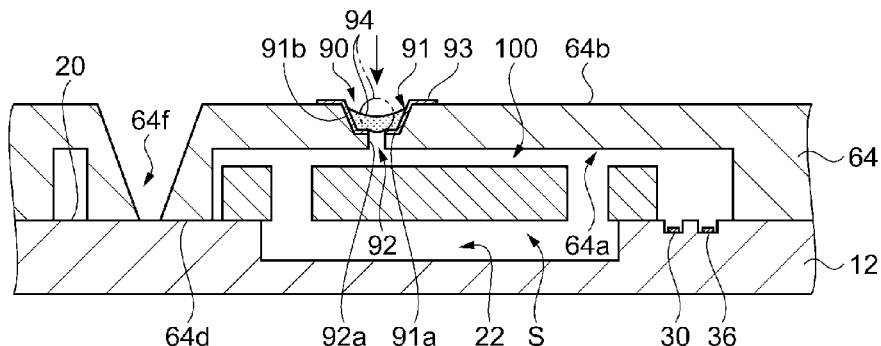

As shown in FIG. 10M, the spherical sealing member 94 is irradiated with a laser beam, an electronic beam, or the like, the sealing member 94 is melted, and the sealing member 94 wets and spreads to the inside of the first hole portion 91 and seals (closes) the penetration hole 90 (second hole 92). Accordingly, the internal space S is sealed in an airtight manner.

At that time, since the metal film 93 is not formed on the inner wall surface 92a of the second hole portion 92, the melted sealing member 94 hardly wets and spreads to the inside of the second hole portion 92. Accordingly, a problem with scattering of the melted sealing member 94 to the internal space S through the second hole portion 92 to attach to the functional element 100 or the like is suppressed.

Dividing Step

Figure 10N:
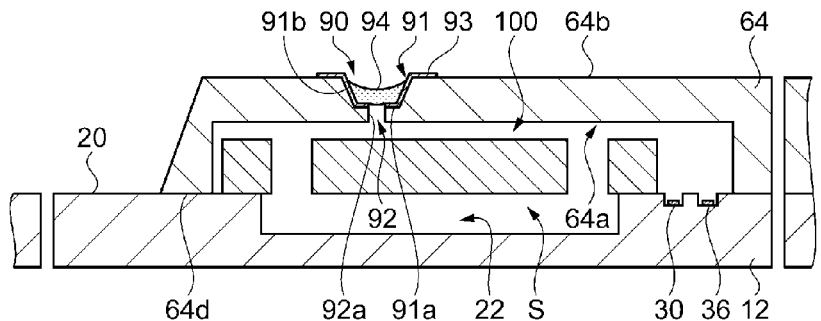

As shown in FIG. 10N, after removing unnecessary portions on the terminal portion 20 of the lid 64, the lid 64 is individually divided by a cutting device such as a dicing saw (not shown).

By performing each step described above, it is possible to obtain the acceleration sensor 1 shown in FIGS. 1 to 3.

As described above, since the manufacturing method of the acceleration sensor 1 includes the step (lid wet etching step) of forming the first hole portion 91 of the penetration hole 90 of the lid 64 by wet etching, the first hole portion 91 can be formed in a shape in which the inner wall surface 91b is inclined so as to set the flat area thereof on the outer surface 64b side greater than the flat area thereof on the bottom surface 91a side.

In addition, since the manufacturing method of the acceleration sensor 1 includes the step (lid dry etching step) of forming the second hole portion 92 of the penetration hole 90 of the lid 64 by dry etching, the second hole portion 92 can be formed in a shape in which the flat surface is a circular shape and at least a part (herein, entirety) of the inner wall surface 92a can substantially form a right angle with respect to the bottom surface 91a of the first hole portion 91.

Therefore, it is possible to manufacture and provide the acceleration sensor 1 with improved reliability of sealing of the penetration hole 90, by the manufacturing method of the acceleration sensor 1.

In addition, since the manufacturing method of the acceleration sensor 1 includes the step (lid dry etching step) of forming the recess 64a of the lid 64 by dry etching, the inner wall surface 64c of the recess 64a of the lid 64 can substantially form a right angle with respect to the bonded surface 64d bonded to the substrate 12.

Therefore, it is possible to manufacture and provide the acceleration sensor 1 which can realize further miniaturization, by the manufacturing method of the acceleration sensor 1.

The manufacturing method of the acceleration sensor 1 may not be a method of providing a plurality of lids described above, and may be performed individually from the start. In this case, the dividing step is not necessary.

The angle of the inner wall surface 64c of the recess 64a of the lid 64 of the acceleration sensor 1 is not limited to the substantial right angle with respect to the bonded surface 64d of the substrate 12, and may be inclined so that the recess 64a is widened as reaching the bonded surface 64d.

The metal film 93 may not be formed on the first hole portion 91 of the penetration hole 90 of the acceleration sensor 1, as long as there is no obstacle to seal the penetration hole 90 (second hole portion 92).

The inner wall surface 91b of the first hole portion 91 of the penetration hole 90 of the acceleration sensor 1 may substantially form a right angle with respect to the bottom surface 91a (outer surface 64b).

Modification Example

Next, a modification example of the acceleration sensor 1 will be described.

Figure 11:
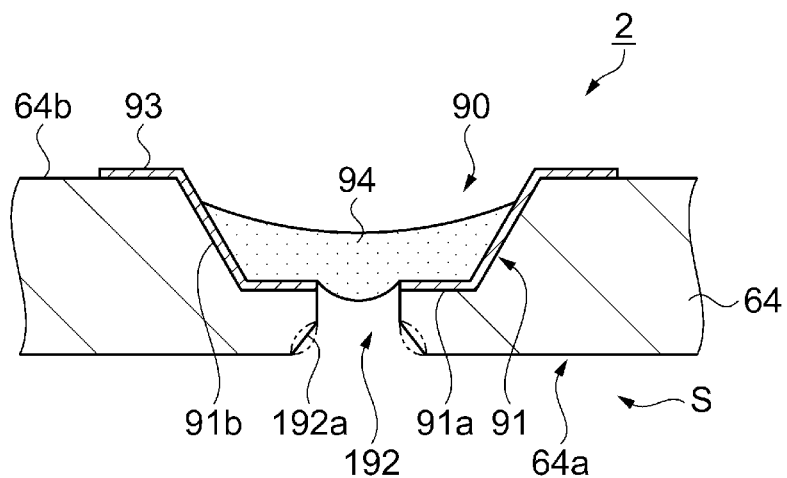
FIG. 11 is an enlarged schematic view showing a schematic configuration of main portions of an acceleration sensor in a modification example.

FIG. 11 is an enlarged schematic view showing a schematic configuration of main portions of an acceleration sensor in the modification example.

The same reference numerals are used for the parts in common with the embodiment described above and the detailed description thereof will be omitted, and the parts different from the embodiments described above will be mainly described.

As shown in FIG. 11, in an acceleration sensor 2 of the modification example, an inner wall surface 192a is inclined from a middle part thereof so that a hole diameter of a second hole portion 192 of the penetration hole 90 of the lid 64 on the recess 64a side is set to be greater than that of the first hole portion 91 on the bottom surface 91a side.

A cross-sectional shape of the inner wall surface 192a may be formed linearly as shown in the drawing, or may be formed with a curved line curved to inside or outside as shown with a dashed-two dotted line.

According to this, in the acceleration sensor 2, since the hole diameter of the second hole portion 192 of the penetration hole 90 on the recess 64a side is set to be greater than that of the first hole portion 91 on the bottom surface 91a side from the middle part thereof, when discharging gas in the recess 64a (internal space S) by reducing pressure or suctioning, for example, the gas can be smoothly discharged compared to a case with a constant hole diameter of the second hole portion 192.

As a result, the acceleration sensor 2 can improve productivity.

The shape of the second hole portion 192 of the penetration hole 90 can be formed by appropriately setting processing conditions of the dry etching process of the second hole portion 192 and the recess 64a in the lid dry etching step.

Electronic Apparatus

Next, an electronic apparatus including the electronic device described above will be described.

Figure 12:
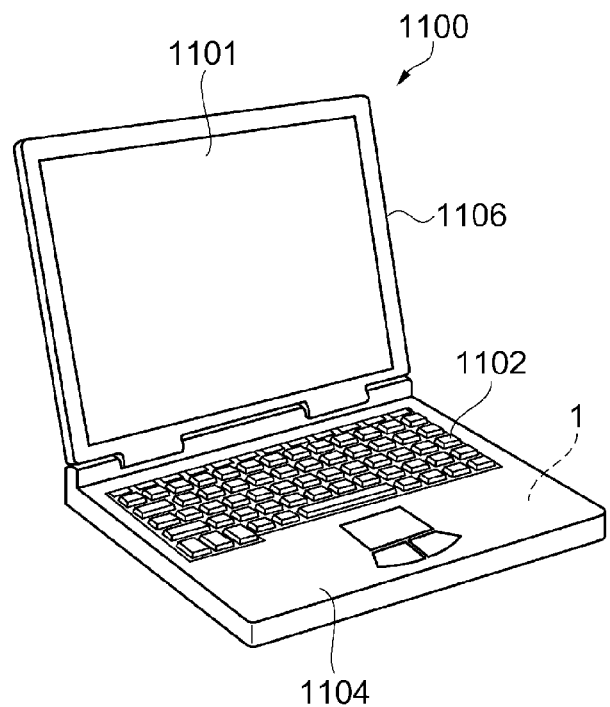
FIG. 12 is a schematic perspective view showing a configuration of a mobile type (or note type) personal computer as an electronic apparatus including an electronic device.

FIG. 12 is a schematic perspective view showing a configuration of a mobile type (or note type) personal computer as the electronic apparatus including the electronic device.

As shown in FIG. 12, the personal computer 1100 is configured with a main body unit 1104 including a keyboard 1102 and a display unit 1106 including a display unit 1101, and the display unit 1106 is rotatably supported with respect to the main body unit 1104 through a hinge structure portion.

The acceleration sensor 1 (or 2) as the electronic device is embedded in such a personal computer 1100.

Figure 13:
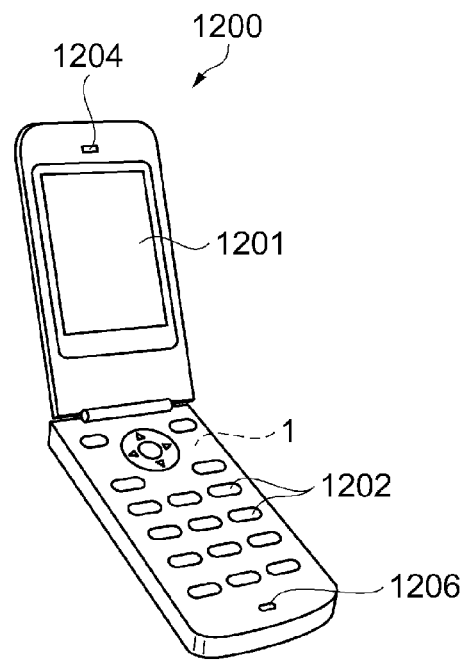
FIG. 13 is a schematic perspective view showing a configuration of a mobile phone (including a PHS) as an electronic apparatus including an electronic device.

FIG. 13 is a schematic perspective view showing a configuration of a mobile phone (including a PHS) as the electronic apparatus including the electronic device.

As shown in FIG. 13, the mobile phone 1200 includes a plurality of operation buttons 1202, an earpiece 1204, and a mouthpiece 1206, and a display unit 1201 is disposed between the operation buttons 1202 and the earpiece 1204.

The acceleration sensor 1 (or 2) as the electronic device is embedded in such a mobile phone 1200.

Figure 14:
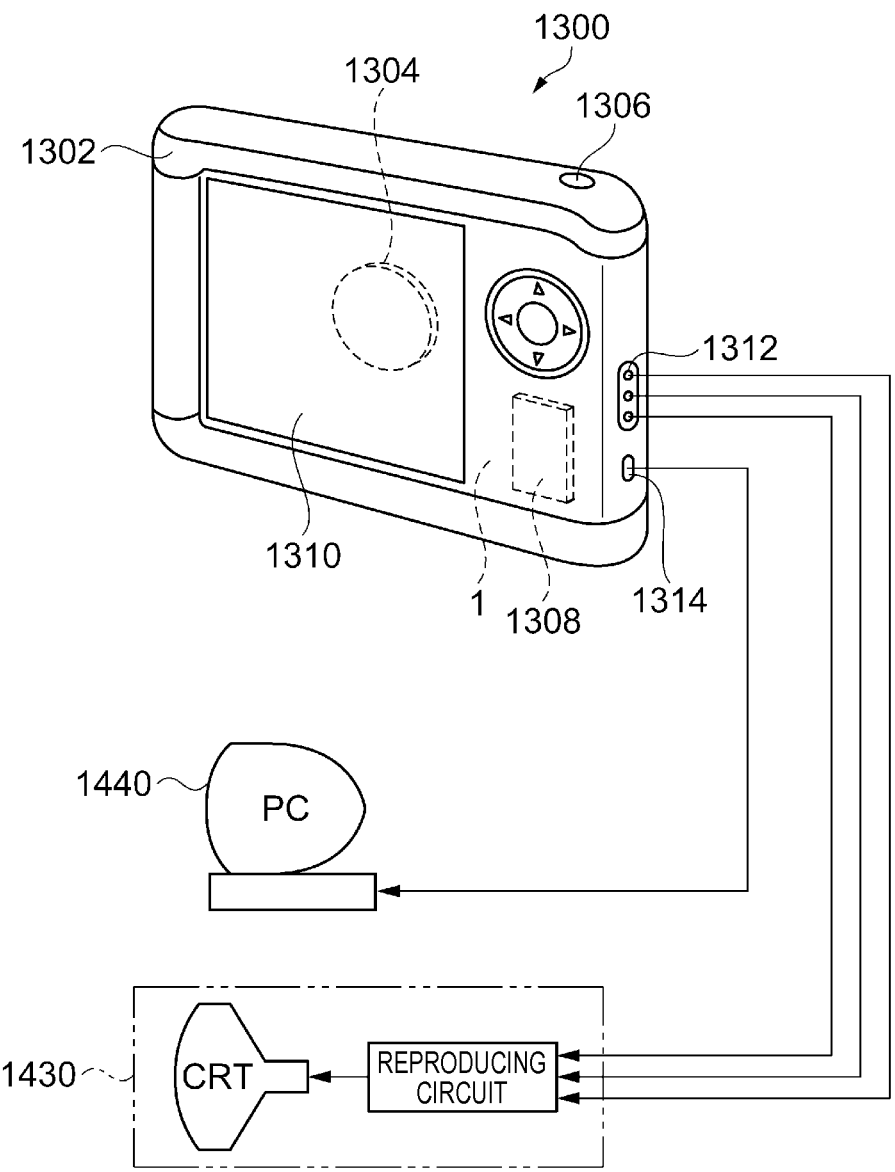
FIG. 14 is a schematic perspective view showing a configuration of a digital still camera as an electronic apparatus including an electronic device.

FIG. 14 is a schematic perspective view showing a configuration of a digital still camera as the electronic apparatus including the electronic device. FIG. 14 also simply shows connection to an external device.

Herein, the digital still camera 1300 generates an imaging signal (image signal) by performing photoelectric conversion of a light image of a subject by an imaging device such as charge coupled device (CCD), whereas a normal camera exposes a silver-halide photo film by a light image of a subject.

A display unit 1310 is provided on a rear surface (front side of drawing) of a case (body) 1302 of the digital still camera 1300 and is configured to perform a display based on the imaging signal by the CCD, and the display unit 1310 functions as a finder for displaying a subject as an electronic image.

A light receiving unit 1304 including an optical lens (optical imaging system), the CCD, or the like is provided on a front surface side of the case 1302 (back surface side in the drawing).

When a photographer confirms a subject image displayed on the display unit 1310 and presses a shutter button 1306, an imaging signal of CCD at that time point is transmitted and stored in a memory 1308.

In the digital still camera 1300, a video signal output terminal 1312 and a data communication input and output terminal 1314 are provided on a side surface of the case 1302. A television monitor 1430 is connected to the video signal output terminal 1312 and a personal computer 1440 is connected to the data communication input and output terminal 1314, respectively if necessary. In addition, the imaging signal stored in the memory 1308 is output to the television monitor 1430 or the personal computer 1440 by a predetermined operation.

The acceleration sensor 1 (or 2) as the electronic device is embedded in the digital still camera 1300.

Since the electronic apparatus includes the electronic device described above, the effects described in the embodiments are reflected and excellent reliability for realizing miniaturization is obtained.

Other than the electronic apparatus described above, the electronic apparatus including the electronic device described above is, for example, an ink jet type discharging apparatus (for example, ink jet printer), a laptop type personal computer, a television, a video camera, a video tape recorder, various navigation apparatuses, a pager, an electronic organizer (including communication function), an electronic dictionary, a calculator, an electronic game device, a word processor, a work station, a video phone, a security monitor, electronic binoculars, a POS terminal, medical equipment (for example, an electronic thermometer, a blood pressure meter, a blood glucose meter, an ECG measuring device, a ultrasound diagnostic device, an electronic endoscope), a fishfinder, a variety of measurement equipment, a meter, a flight simulator, or the like. In any cases, the electronic apparatus includes the electronic device described above, the effects described in the embodiments are reflected and excellent reliability for realizing miniaturization is obtained.

Moving Object

Next, a moving object including the electronic device described above will be described.

Figure 15:
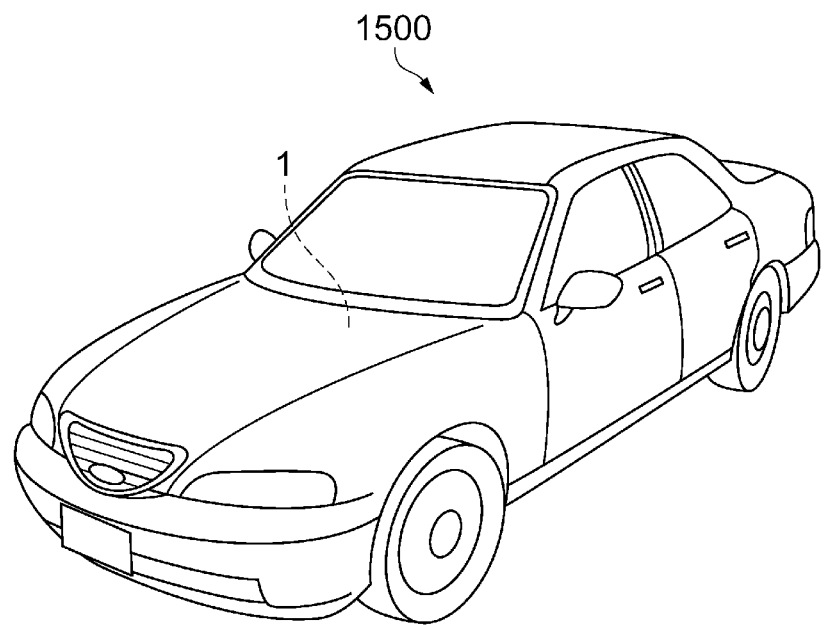
FIG. 15 is a schematic perspective view showing an automobile as an example of a moving object including an electronic device.

FIG. 15 is a schematic perspective view showing an automobile as an example of a moving object including the electronic device.

In an automobile 1500, the acceleration sensor 1 (or 2) as the electronic device is used as an attitude detection sensor such as a navigation device or an attitude control device embedded therein, for example.

According to this, since the automobile 1500 includes the electronic device described above, the effects described in the embodiments are reflected and excellent reliability is obtained.

The electronic device described above is not limited to be used in the automobile 1500, and can be appropriately used as the attitude detection sensor of a moving object including a self-travelling robot, self-travelling transfer equipment, a train, a ship, a plane, or a satellite, and in any cases, the effects described in the embodiments are reflected and the moving object having excellent reliability can be provided.

The electronic device described above is not limited to the acceleration sensor, and may be an angular velocity sensor in which a functional element has an angle velocity detection function, a pressure sensor in which a functional element has a pressure detecting function, a weight sensor in which a functional element has a weight detection function, or a composite sensor obtained by combining those sensors (including the acceleration sensor).

In addition, the electronic device may be a vibrator, an oscillator, and a frequency filter in which a functional element is a vibrating piece.

The electronic device has a configuration in that the substrate having a substantially rectangular flat plate shape and the cover on which the recess is provided are bonded to each other, but it is not limited thereto, and the substrate on which the recess is provided may be bonded to the cover having a substantially rectangular flat plate shape.

What is claimed is:

1. An electronic device comprising:
    a substrate;
    a cover which has an outer cover surface and an inner cover surface, the cover being bonded to the substrate so as to form an inner space between the substrate and the cover; and
    a functional element which is provided in the inner space,
    wherein the cover includes a penetration hole which penetrates the cover from the outer cover surface to the inner cover surface,
    the penetration hole includes a first hole portion which is provided on an outer cover side of the cover directly adjacent to the outer cover surface, and the penetration hole includes a second hole portion which communicates with the first hole portion and which is provided on an inner cover side of the cover directly adjacent to the inner cover surface,
    an opening of the second hole portion on the inner cover side is smaller than an opening of the first hole portion on the outer cover side,
    at least a part of an inner wall surface of the second hole portion substantially forms a right angle with respect to a bottom surface of the first hole portion,
    wherein the penetration hole is sealed with a sealing member, and
    wherein glass is used as a main material of the substrate and silicon is used as a main material of the cover.

2. The electronic device according to claim 1,
    wherein the opening of the second hole portion on the inner cover side is in a circular shape.

3. The electronic device according to claim 1,
    wherein an inner wall surface of the first hole portion is inclined so that the opening of the first hole portion on the outer cover side is greater than an opening of the first hole portion located directly adjacent to the bottom surface of the first hole portion, and the inner wall surface and the bottom surface of the first hole portion is covered with a metal film.

4. The electronic device according to claim 1,
wherein the cover is configured with a top cover which has the outer and inner cover surfaces and a side cover which is continuously formed with the top cover, and a side cover bottom surface of the side cover is bonded to the substrate, and an inner wall surface of the side cover of the cover substantially forms a right angle with respect to the side cover bottom surface.

5. A manufacturing method of an electronic device, the electronic device including:
a substrate;
a cover which has an outer cover surface and an inner cover surface, the cover being bonded to the substrate so as to form an inner space between the substrate and the cover; and
a functional element which is provided in the inner space,
wherein the cover includes a penetration hole which penetrates the cover from the outer cover surface to the inner cover surface,
the penetration hole includes a first hole portion which is provided on an outer cover side of the cover directly adjacent to the outer cover surface, and the penetration hole includes a second hole portion which communicates with the first hole portion and which is provided on an inner cover side of the cover directly adjacent to the inner cover surface,
an opening of the second hole portion on the inner cover side is smaller than an opening of the first hole portion on the outer cover side,
at least a part of an inner wall surface of the second hole portion substantially forms a right angle with respect to a bottom surface of the first hole portion, and
wherein the penetration hole is sealed with a sealing member, the method comprising:
forming the first hole portion by wet etching; and
forming the second hole portion by dry etching,
wherein a hole diameter of the second hole portion on the inner cover surface is greater than that of the first hole portion located directly adjacent to the bottom surface of the first hole portion.

6. The manufacturing method of an electronic device according to claim 5,
wherein the cover is configured with a top cover which has the outer and inner cover surfaces and a side cover which is continuously formed with the top cover,
the method further comprising:
forming the side cover by dry etching.

7. An electronic apparatus comprising the electronic device according to claim 1.

8. A moving object comprising the electronic device according to claim 1.

9. An electronic device comprising:
a substrate;
a cover which has an outer cover surface and an inner cover surface, the cover being bonded to the substrate so as to form an inner space between the substrate and the cover; and
a functional element which is provided in the inner space,
wherein the cover includes a penetration hole which penetrates the cover from the outer cover surface to the inner cover surface,
the penetration hole includes a first hole portion which is provided on an outer cover side of the cover directly adjacent to the outer cover surface, and the penetration hole includes a second hole portion which communicates with the first hole portion and which is provided on an inner cover side of the cover directly adjacent to the inner cover surface,
an opening of the second hole portion on the inner cover side is smaller than an opening of the first hole portion on the outer cover side,
at least a part of an inner wall surface of the second hole portion substantially forms a right angle with respect to a bottom surface of the first hole portion,
wherein the penetration hole is sealed with a sealing member, and
wherein a hole diameter of the second hole portion on the inner cover surface is greater than that of the first hole portion located directly adjacent to the bottom surface of the first hole portion.

* * * * *